United States Patent
Shen et al.

(10) Patent No.: US 9,614,619 B1
(45) Date of Patent: Apr. 4, 2017

(54) OPTICAL TRANSCEIVER HAVING SEPARATE TRANSMITTER AND RECEIVER LENSES

(71) Applicant: Google Inc., Mountain View, CA (US)

(72) Inventors: Zuowei Shen, Los Altos, CA (US); Jamyuen Ko, San Jose, CA (US); Melanie Beauchemin, Mountain View, CA (US); Hong Liu, Palo Alto, CA (US); Ryohei Urata, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/678,227

(22) Filed: Apr. 3, 2015

Related U.S. Application Data

(60) Provisional application No. 62/062,495, filed on Oct. 10, 2014.

(51) Int. Cl.
*H04B 10/40* (2013.01)

(52) U.S. Cl.
CPC .................................. *H04B 10/40* (2013.01)

(58) Field of Classification Search
CPC ................................ H04B 10/40; H04B 10/43
USPC .................................................. 398/135–139
See application file for complete search history.

(56) References Cited

U.S. PATENT DOCUMENTS

| | | | |
|---|---|---|---|
| 7,561,805 B2* | 7/2009 | Aoki | G02B 6/4201 372/34 |
| 8,231,284 B2 | 7/2012 | Doany et al. | |
| 9,039,303 B2* | 5/2015 | Wang | H04B 10/40 385/147 |
| 2003/0161588 A1* | 8/2003 | Wolf | G02B 6/4277 385/88 |
| 2004/0240803 A1* | 12/2004 | Rechberger | G02B 6/4201 385/93 |
| 2005/0078962 A1* | 4/2005 | Hofmeister | G02B 6/421 398/135 |
| 2005/0084269 A1* | 4/2005 | Dallesasse | G02B 6/4201 398/135 |
| 2005/0094686 A1* | 5/2005 | Aoki | G02B 6/4201 372/35 |
| 2005/0168957 A1* | 8/2005 | Kawauchi | G02B 6/4246 361/749 |
| 2005/0244095 A1* | 11/2005 | Ellison | G02B 6/4246 385/14 |
| 2005/0244110 A1 | 11/2005 | Togami et al. | |
| 2005/0271391 A1 | 12/2005 | Togami et al. | |

(Continued)

*Primary Examiner* — Li Liu

(74) *Attorney, Agent, or Firm* — McDermott Will & Emery LLP

(57) ABSTRACT

The present disclosure discusses an improved optical transceiver. The optical transceiver of the present disclosure includes an optical transmitter and an optical receiver that are spatially separated. In some implementations, the optical receiver and optical transmitter are staggered from one another. Each of the optical receiver and the optical transmitter and housed within a separate optical lens. In some implementations, the separation of the components reduces mechanical, thermal, and electrical cross talk between the optical transmitter and the optical receiver. The separation of the components can also ease the constraints of the optical alignment between the optical transmitter and the optical receiver and each of their respective lenses.

15 Claims, 4 Drawing Sheets

(56) References Cited

U.S. PATENT DOCUMENTS

| | | | |
|---|---|---|---|
| 2008/0069570 A1* | 3/2008 | Dallesasse | H04B 10/40 398/139 |
| 2009/0016722 A1* | 1/2009 | Smith | H04J 14/0227 398/68 |
| 2009/0067849 A1* | 3/2009 | Oki | G02B 6/4201 398/136 |
| 2009/0162051 A1* | 6/2009 | Hudgins | H04B 10/40 398/9 |
| 2010/0067854 A1* | 3/2010 | Oki | H01R 13/748 385/92 |
| 2012/0076501 A1* | 3/2012 | Ko | G02B 6/32 398/135 |
| 2012/0163811 A1* | 6/2012 | Doany | H04B 10/40 398/41 |
| 2013/0339559 A1* | 12/2013 | Tanaka | G06F 13/4022 710/110 |
| 2014/0147127 A1* | 5/2014 | McColloch | H05K 7/20409 398/135 |
| 2014/0178079 A1 | 6/2014 | Yagisawa et al. | |
| 2014/0219609 A1* | 8/2014 | Nielson | G02B 6/46 385/54 |
| 2014/0270765 A1* | 9/2014 | Cole | H04B 10/27 398/48 |
| 2015/0078760 A1* | 3/2015 | Kurashima | H04B 10/40 398/139 |
| 2015/0104177 A1* | 4/2015 | Kato | H04B 10/40 398/79 |
| 2015/0253520 A1* | 9/2015 | Huang | G02B 6/4206 385/90 |
| 2015/0256259 A1* | 9/2015 | Huang | G01J 1/0271 398/88 |
| 2015/0256261 A1* | 9/2015 | Ho | G02B 6/43 398/139 |
| 2015/0341118 A1* | 11/2015 | Wang | H04B 10/2503 398/139 |

* cited by examiner

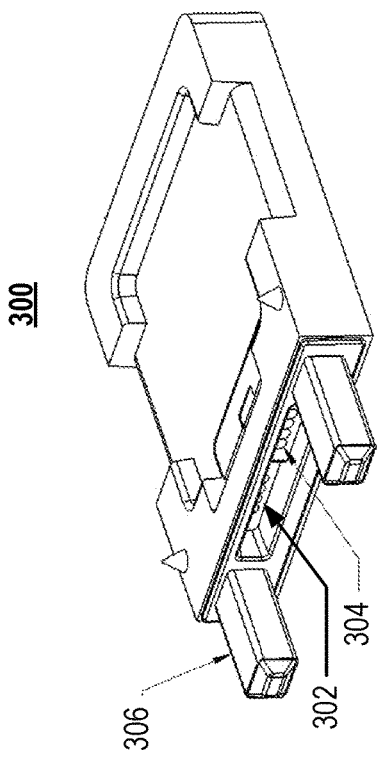
*FIGURE 3A*
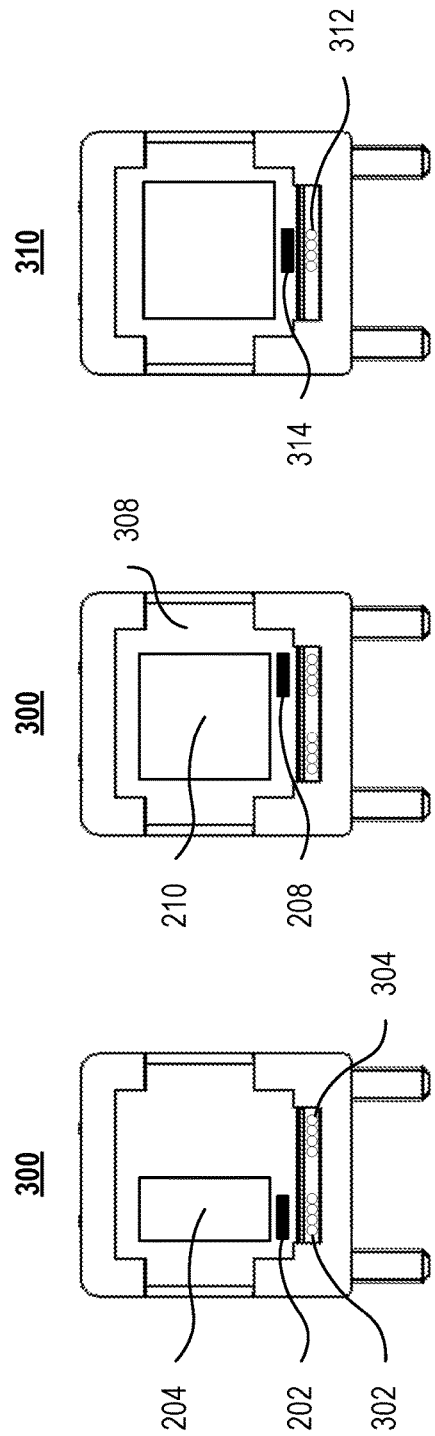
*FIGURE 3D*
*FIGURE 3C*
*FIGURE 3B*

OPTICAL TRANSCEIVER HAVING SEPARATE TRANSMITTER AND RECEIVER LENSES

CROSS-REFERENCE TO RELATED APPLICATIONS

This application claims priority to U.S. Provisional Patent Application No. 62/062,495 filed on Oct. 10, 2014 and titled "Optical Transceiver Having Separate Transmitter And Receiver Lenses," which is herein incorporated by reference in its entirety.

BACKGROUND OF THE DISCLOSURE

Datacenter networks include a plurality of interconnected nodes. In some datacenters, the nodes are interconnected by optical links. The amount of data passed between the interconnected nodes is increasing. The increased amount of data transmission increases the power consumption of the optical transceivers within the interconnected nodes.

SUMMARY OF THE DISCLOSURE

According to one aspect of the disclosure, an optical transceiver includes an optical transmitter including a first chip-on-board package and an optical receiver including a second chip-on-board package. The optical transmitter and the optical receiver are coupled to a printed circuit board (PCB) and spatially separated from one another. The optical transmitter includes a light source electrically coupled with a driver circuit. The light source and the driver circuit are covered by a first lens. The optical receiver includes a light detector electrically coupled with a receiver circuit. The light detector and the receiver circuit are covered by a second lens.

According to another aspect of the disclosure, a method of manufacturing an optical transceiver includes coupling an optical transmitter to a PCB. The optical transmitter is configured in a first chip-on-board package. The optical transmitter also includes a light source electrically coupled with a driver circuit. The method also includes coupling an optical receiver to the PCB a predetermined distance away from the optical transmitter. The optical receiver is configured in a second chip-on-board package. The optical receiver includes a light detector electrically coupled with a receiver circuit. The method also includes covering the optical transmitter with a first lens, and covering the optical receiver with a second lens.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which:

FIGS. 3A-3D illustrate various views and configurations of example lenses for use in the example data center network of FIG. 1.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

As an overview, as the data transfer rate of optical transceivers increases, the power required to operate the optical transceivers increases. The increase in power consumption can result in higher operating temperatures. The increased operating temperatures can reduce optical component (laser) reliability and degrade performance of the optical component. The present disclosure increases optical transceiver performance by spatially separating the optical transmitter and optical receiver of the optical transceiver and placing each of the optical transmitter and optical receiver under separate lenses. In some implementations, the separation of the components reduces electrical cross talk between the optical transmitter and the optical receiver. The separation of the components can also improve optical alignment and improve thermal dissipation.

Figure 1:
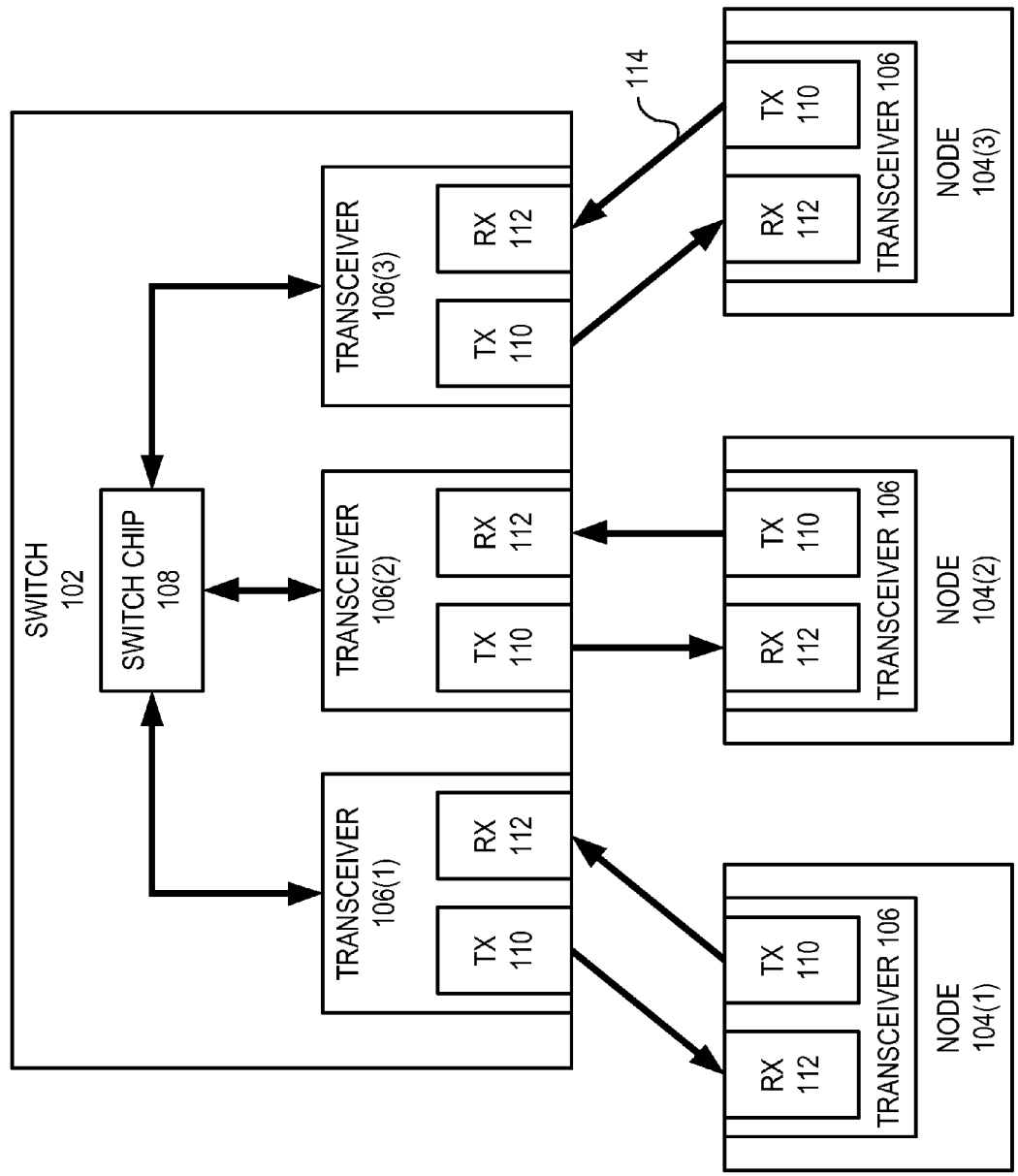
FIG. 1 illustrates an example data center network.

FIG. 1 illustrates an example data center network 100. The network 100 includes a switch 102 that is connected to nodes 104(1)-104(3) (generally referred to as nodes 104). The switch 102 includes transceivers 106(1)-106(3) (generally referred to as transceivers 106). Within the switch 102, the transceivers 106 are interconnected with one another through a switch chip 108, which handles the communication between each of the transceivers 106. Each of the transceivers 106 includes an optical transmitter 110 and an optical receiver 112. Each node 104 also includes a transceiver 106 with an optical transmitter 110 and an optical receiver 112. The optical transmitter 110 of a transceiver 106 is coupled with an optical receiver 112 of another transceiver 106 through an optical cable 114. In some implementations, the transceivers 106 of the switch 102 are configured differently than the transceivers of the nodes 104.

The switch 102 of the data center network 100 is an aggregation device that couples one or more nodes 104 together. The switch 102 routes data between the nodes 104, and in some implementations, other switches 102 or aggregation devices. As illustrated, the switch 102 includes three transceivers 106, enabling the switch 102 to connect to three nodes 104. In some implementations, the switch 102 includes 8, 12, 24, 32, 62, or more transceivers 106. The switch 102 facilitates the routing of data between nodes 104. In some implementations, the switch 102 is an optical packet switch that receives packets of data and reviews a header of each of the packets for routing information. The switch 102 can then select to which node 104 to route the data responsive to the routing information contained within the header of the packet. In some implementations, the switch 102 may also reference a routing table stored in memory to determine to which node 104 the data is routed. In other implementations, the interconnection between the transceivers 106 of the switch 102 is fixed in the hardware of the switch 102 and the reconfiguring of a network topology is achieved through physically disconnecting and reconfiguring the optical cables 114.

The switch 102 includes three transceivers 106. The transceivers 106 are discussed in greater detail in relation to FIG. 2, but briefly, each of the transceivers 106 includes an optical transmitter 110 and an optical receiver 112 for communication with a node 104. Each of the optical transmitters 110 receives an electrical data stream and converts the electrical data stream into an optical data stream for transmission over one of the optical cables 114. Conversely, each of the optical receivers 112 receives an optical data stream and then converts the optical data stream into an electrical data stream. The optical transmitter 110 and the optical receiver 112 of each optical transmitter 110 are spatially separated in at least one direction. The optical transmitter 110 and the optical receiver 112 of each of optical transceivers are covered by separate lenses. The lenses focus the light generated by the optical transmitter 110 onto the optical cable 114 or focus the light received from an optical cable 114 onto a light detector within the optical receiver 112. In some implementations, the separation of the components reduces mechanical, thermal, and electrical cross talk between the optical transmitter and the optical receiver. The separation of the components can also ease the constraints of the optical alignment between the optical transmitter 110 and the optical receiver 112 and each of their respective lenses.

In some implementations, the transceivers 106 are hot-pluggable transceivers. For example, the transceivers 106 may be in a quad, small form-factor pluggable (QSFP or QSFP+) housing. In other implementations, the transceivers 106 are configured in a small, form-factor pluggable (SFP) transceiver housing or other form factor used in data center network switches and routers.

The data center network 100 also includes a plurality of nodes 104. In some implementations, the nodes 104 are switches, routers, superblocks, spineblocks, top-of-rack switches, servers, computers, a combination thereof, or any network connected device that are configured to communicate with one another over optical cables 114.

The switch 102 and the nodes 104 of the data center network 100 are interconnected by optical cables 114. In some implementations, the optical cables 114 are short reach connections less than 100 m, although in some implementations, the length of the optical cable 114 is about 500 m. An optical cable 114 can include, but is not limited to, multi-mode fibers such as optical multi-mode (OM) 1, OM2, OM3, and OM4. In some implementations, the optical cables 114 are single mode fibers. In some implementations, each optical cable 114 includes more than one optical fiber connection. For example, when the transceiver 106 is configured as a QSFP transceiver, each optical cable 114 includes four optical fiber connections. In some implementations, the optical cable 114 coupled with the optical transmitter 110 and optical receiver 112 of a transceiver 106 are housed within a single cable. For example, each optical cable 114 may include four TX fibers and four RX fibers, though other numbers of TX and RX fibers can be included in other implementations.

Figure 2:
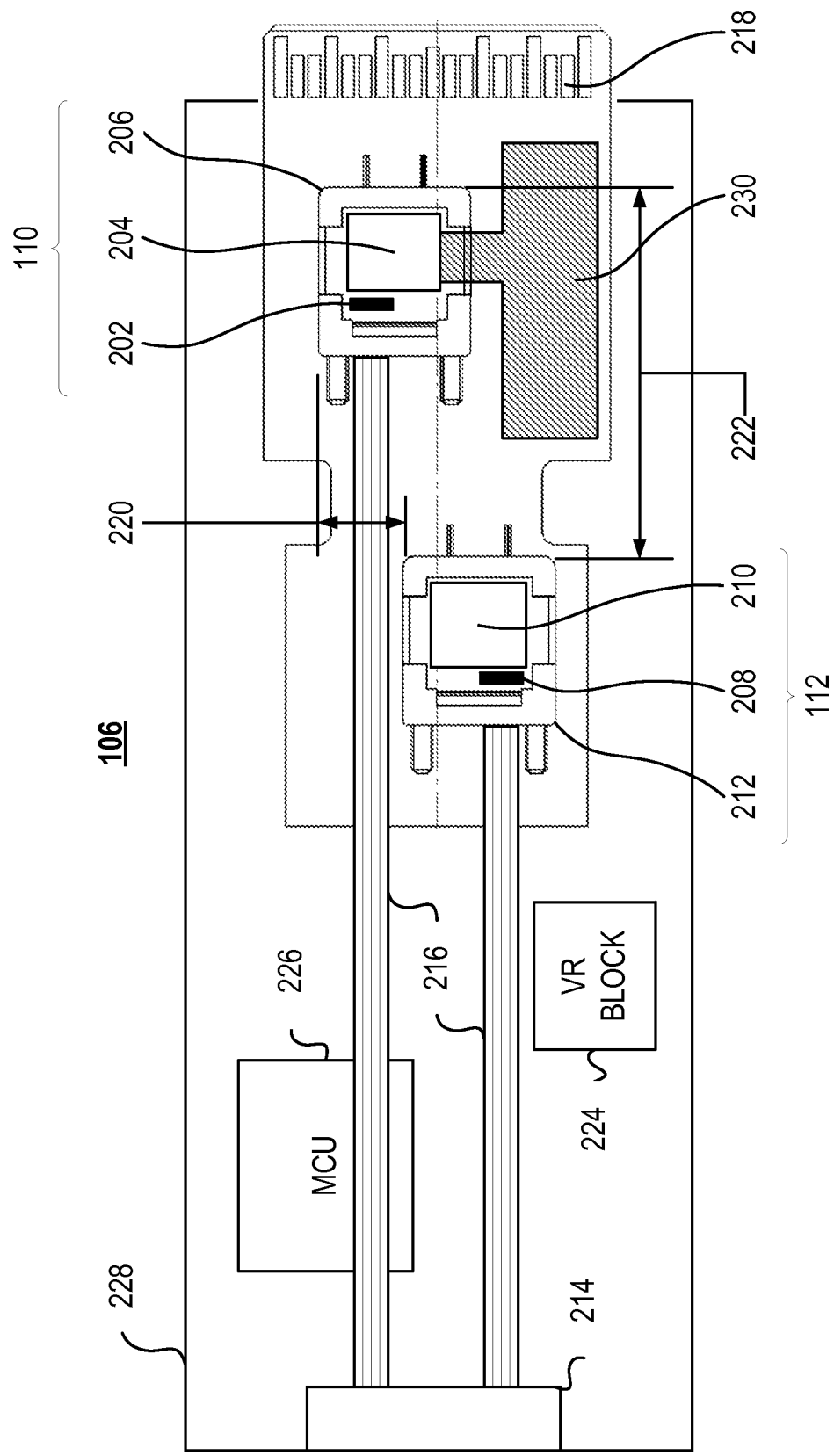
FIG. 2 illustrates an example transceiver for use in the example data center network of FIG. 1.

FIG. 2 illustrates an example transceiver 106 for use in the data center network 100. The transceiver 106 includes an optical transmitter 110 and an optical receiver 112. The optical transmitter 110 includes a light source 202 and a driver circuit 204, and is covered by a first lens 206. The optical receiver 112 of the transceiver 106 includes a light detector 208 and a receiver circuit 210, and is covered by a second lens 212. The optical receiver 112 and optical transmitter 110 are each coupled to an optical connector 214 by fiber optic jumper cables 216. The transceiver 106 interfaces with the switch 102 through an edge connector 218. The optical transmitter 110 is offset from the optical receiver 112 in a first dimension by a first predetermined distance 220 and a second dimension by a second predetermined distance 222. The transceiver 106 also includes a voltage regulator (VR) block 224 and a microcontroller 226. The components of the transceivers 106 are coupled onto a printed circuit board (PCB) 228. The printed circuit board 228 includes a heat spreader 230, part of which is positioned under the optical transmitter 110.

The edge connector 218 of the transceiver 106 enables the transceiver 106 to communicate with the motherboard of the switch 102. The edge connector 218 includes a plurality of gold-plated connectors and is referred to as a finger connector in some implementations. The edge connector 218 includes about 24 to about 120 connectors over which data and power is transmitted. Power from the motherboard of the switch 102 is supplied, via the edge connector 218, to the VR block 224. The VR block 224 supplies between about 1 V and about 5 V to the microcontroller 226 and the other active components of the transceivers 106.

The microcontroller 226 of the transceiver 106 controls the operation of the transceiver 106. The microcontroller 226 is a single or multicore processor that is capable of executing computer executable instructions, such as programs and scripts. In some implementations, the microcontroller 226 controls the conversion of electrical data streams into optical data streams for transmission by the optical transmitter 110 and the conversion of optical data streams into electrical data streams received by the optical receiver 112.

The optical transmitter 110 and the optical receiver 112 of the transceiver 106 transmit and receive, respectively, optical signals. Optical data streams enter and exit the transceiver 106 via the optical connector 214 via. The optical connector 214 is coupled with each of the optical transmitter 110 and optical receiver 112 via a fiber optic jumper cable 216. As illustrated, a separate fiber optic jumper cable 216 couples the optical connector 214 to each of the optical transmitter 110 and the optical receiver. In some implementations, when the light source 202 is an array of light sources and the light detector 208 is an array of light detectors, the number of fibers within each fiber optic jumper cable 216 matches the number of light sources or light detectors in each of the arrays. For example, the transceiver 106 is illustrated in a Quad-SFP configuration. Accordingly, each of the fiber optic jumper cables 216 includes four fibers. The fiber optic jumper cable 216 can be coupled to an MT ferrule or other optical terminal. The optical terminal is coupled with the optical connector 214, such as an MPO connector or other multi-fiber connector, which accepts the optical cable 114.

The optical transceiver 106 includes an optical transmitter 110. In general, the optical transmitter 110 refers to the region of the PCB 228 where the driver circuit 204 and the light source 202 are coupled to the PCB, and which is covered by the first lens 206. The driver circuit 204 and the light source 202 are covered by the first lens 206. In some implementations, the driver circuit 204 is an integrated circuit (IC). In some implementations, the light source 202 includes one or more light sources configured in an array. In some implementations, the light source 202 includes one or more VCSELs (vertical-cavity surface-emitting laser). Each of the one or more light sources 202 are aligned with one of the fibers in the outgoing fiber optic jumper cable 216. In some implementations, the driver circuit 204 is a 4-channel VCSEL driver with an integrated CDR (clock data recovery). In other implementations, the driver circuit 204 does not include a CDR. The driver circuit 204 modulates the current delivered to the light source 202, controlling the light output of the light source 202. As described further in relation to FIG. 3, the first lens 206 includes an optical surface that focuses the light generated by the light source 202 into a respective fiber of the fiber optic jumper cable 216. In some implementations, the driver circuit 204 is configured in a chip-on-board package. In a chip-on-board configuration, the bare die (e.g., the unpackaged semiconductor) of the driver circuit 204 is mounted directly onto the PCB 228 board. Wire bonds are made between the contacts of the bare die and the traces of the PCB. An epoxy is then applied over the bare die, encapsulating the bare die and the wire bonds. The chip-on-board configuration is in contrast to standard packaging system where the bare die is mounted within a package, which is then mounted to a PCB. For example, in a small outline package (SOP), the bare die is packaged within the SOP. Internally, wire connections are made between the contacts of the bare die and the SOP pins. The SOP is surface mounted to a PCB. In some implementations, chip-on-board packages are advantageous to other packaging designs because they have a smaller footprint and because the bare die can sit directly on a heat spreader.

The optical transceiver 106 also includes an optical receiver 112. In general, the optical receiver 112 refers to the region of the PCB 228 where the receiver circuit 210 and the light detector 208 are coupled to the PCB, and which is covered by the second lens 212. Light travels toward the optical receiver 112 through the fiber optic jumper cable 216 and is projected onto the light detector 208. The optical surfaces within the second lens 212 focus the light exiting each of the fibers of the fiber optic jumper cable 216 onto the light detector 208. In some implementations, the light detector 208 includes an array of light detectors, such as an array of photodiodes. The light detector 208 is electrically coupled with the receiver circuit 210. In some implementations, the receiver circuit 210 is configured in a chip-on-board package. The receiver circuit 210 includes a transimpedance amplifier (TIA) and a CDR. In some implementations, the receiver circuit 210 does not include a CDR. The TIA is a current to voltage regulator, which converts the current generated by the light detector 208 as light hits the light detector from the fiber optic jumper cable 216 into an electrical signal. The CDR generates a clock signal that is used to phase align the received signal, such that the received optical signal may be accurately converted into a digital signal.

The optical transmitter 110 and the optical receiver 112 are spatially separated from one another and are covered by respective lenses. As illustrated in FIG. 2, the optical transmitter 110 and the optical receiver 112 are separated along a first dimension by a predetermined distance 220 and a second dimension by a predetermined distance 222. In some implementations, when the optical transmitter 110 and the optical receiver 112 are spatially separated from one another along both the first and second dimensions it is referred to as staggering the optical transmitter 110 and the optical receiver 112. In some implementations, the distance of the separation, in either dimension, is between about 1 mm and about 10 mm, between about 2 mm and about 7 mm, or between about 2 mm and about 5 mm. In some implementations, the optical transmitter 110 and the optical receiver 112 are separated along only one dimension—for example the first dimension. In some implementations, the predetermined distance 220 in the first dimension is greater than the predetermined distance 222 in the second dimension. For example, the predetermined distance 220 in the first dimension may be between about 4 mm to about 10 mm and the predetermined distance 222 in the second dimension may be between about 0 mm and about 5 mm.

In some implementations, separating the optical transmitter 110 and the optical receiver 112 and the placement of each under a separate lens provides a number of benefits. For example, and as further described in relation to FIG. 3, the placement accuracy of the lens with respect to the light source 202 and the light detector 208 is improved. Also, dissipation of the heat generated by the driver circuit 204 and the receiver circuit 210 is improved. As described above, the receiver circuit 210 and the driver circuit 204 may each include an integrated CDR. ICs with integrated CDRs can consume more power than ICs without integrated CDRs. The higher power consumption increases the operating temperature of the IC, which can affect the optical transmitter 110 and the optical receiver 112. In some implementations, the performance and reliability of the VCSEL (or, in general, the light source 202) is sensitive to increased temperatures. By moving the optical receiver 112 away from the optical transmitter 110, the heat generated by the receiver circuit 210 is less likely to affect the light source 202. Also, separating and placing the optical transmitter 110 and the optical receiver 112 under separate lenses, enables the optical transmitter 110 to be placed atop the heat spreader 230.

Still referring to FIG. 2, the transceiver 106 also includes a heat spreader 230. In some implementations, one or more components of the optical transmitter 110 or one or more components of the optical receiver 112 sit atop portions of different heat spreaders 230. In some implementations, the driver circuit 204 and the receiver circuit 210 are configured in chip-on-board packages, and can sit atop the heat spreader 230 without shorting electrical connections. The heat spreader 230 draws heat away from the components that sit atop the heat spreader 230 (the driver circuit 204 in FIG. 2) and lowers the operating temperatures of the component. The heat spreader 230 can be a copper or other metal plane on the PCB 228 that wicks heat away from the components. In some implementations, the heat spreader 230 is coupled to the housing of the transceiver 106 or a heat sink.

FIGS. 3A-3D illustrate example configurations of a lens for use in the transceivers 106 of FIG. 2. FIG. 3A illustrates an isometric view of an example lens 300. The lens 300 includes a first set of optical surfaces 302 and a second set of optical surfaces 304. The lens 300 also includes two alignment posts 306. As is illustrated in FIG. 2, the lens 300 sits atop the circuit associated with an optical transmitter or an optical receiver. The circuit fits within a cavity formed in the underside of the lens 300. In some implementations, a single lens 300 design is designed for use with both an optical transmitter and an optical receiver. Configuring the lens 300 to work with either the optical transmitter 110 or the optical receiver 112 reduces manufacturing costs because only one part needs to be manufactured (rather than two different types of lens) for both the optical transmitter and the optical receiver. In some implementations, the optical surfaces 302 and the optical surfaces 304 have different optical prescriptions. For example, the optical surfaces 304 may have an optical prescription configured for receiving optical signals and the optical surfaces 302 can have an optical prescription configured for transmitting optical signals. In some implementations, the interior of the lens 300 includes one or more mirrors that direct light between the optical surfaces 302 and 304 to components within the lens 300. The two alignment posts 306 ensure the fiber optic jumper cable 216 correctly align with the optical surfaces 302 and optical surfaces 304.

FIGS. 3B and 3C illustrate how the same lens configuration can be used as part of an optical transmitter or an optical receiver. FIG. 3B illustrates a top view of the example lens 300. As illustrated, the lens 300 sits atop a light source 202 and a driver circuit 204. FIG. 3B illustrates that when the lens 300 is used in conjunction with the driver circuit 204 and light source 202, the light source 202 is aligned with the optical surfaces 302. In some implementations, separating the optical transmitter and the optical receiver from one another and placing the optical transmitter and the optical receiver under separate lenses increases manufacturing efficiency because the optical surfaces of each lens 300 are only aligned with the light source 202 or the light detector 208 which the lens 300 houses. For example, in FIG. 3B, the optical surfaces 302 are aligned with the light source 202 and the optical surfaces 304 are not aligned with any component because the optical transmitter and the optical receiver are separated and housed under separate lenses 300. When the optical transmitter and the optical receiver are placed under separate lens, a misplacement (e.g., a rotation with respect to a fiducial placement marker) of the light source 202 or the light detector 208 can be accounted for by equally misplacing the lens 300. If both the optical transmitter and the optical receiver are housed under a single lens, the adjustment of the alignment between the optical surfaces 302 and the optical light source 202 cannot be made without simultaneously adjusting the alignment between the optical surfaces 304 and the light detector 208, and vise versa.

FIG. 3C illustrates a top view of the example lens 300. In the example illustrated in FIG. 3C, the lens 300 sits atop a receiver circuit 210 and a light detector 208. As illustrated in FIG. 3B, the lens 300 is only aligned with one component, the light detector 208. FIG. 3C also illustrates the flexibility of the lens 300 in use with different sized components. Because the lens 300 is configured to cover only one of the optical transmitter and the optical receiver, the cavity 308 of the lens has ample room to store a diverse number of components and components of a diverse size. Contrasting FIG. 3B with FIG. 3C, FIG. 3B illustrates that the lens 300 is able to cover a relatively smaller driver circuit 204 while the FIG. 3C illustrates the lens 300 is able to cover a relatively larger receiver circuit 210.

FIG. 3D illustrates a top view of another example lens 310. The lens 310 includes only a single set of optical surfaces 312. The single set of optical surfaces is aligned with a light source or a light detector.

In some implementations, the lenses described herein can include more than two sets of optical surfaces. In some implementations, each set of optical surfaces includes between 2 and 24, between 2 and 18, between 2 and 12, or between 4 and 8 optical surfaces.

Figure 4:
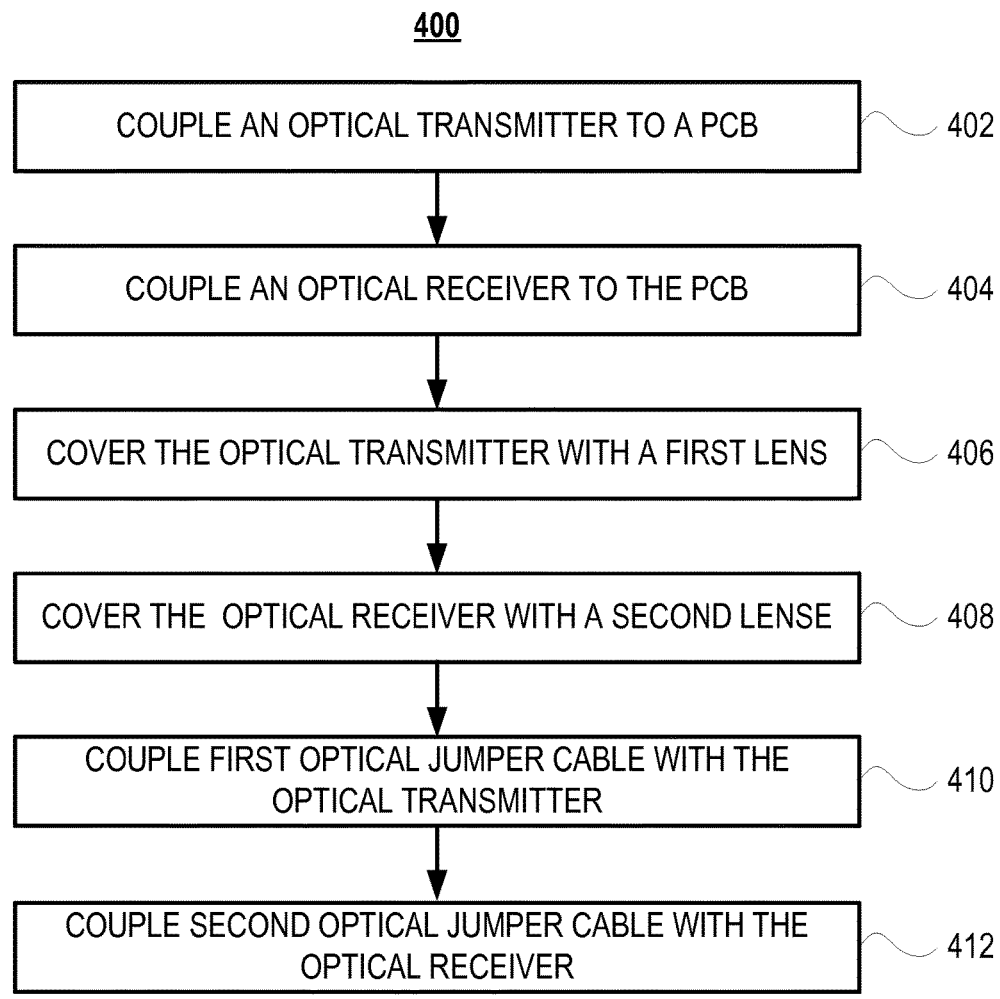
FIG. 4 illustrates a flow chart of an example method for manufacturing the transceiver for use in the example of data center network of FIG. 1.

FIG. 4 illustrates an example method 400 for manufacturing an optical transceiver. The method 400 includes coupling the components of an optical transmitter to a printed circuit board (PCB) (step 402). The components of an optical receiver are also coupled to the PCB (step 404). The optical transmitter is covered with a first lens (step 406) and the optical receiver is covered with a second lens (step 408). A first optical jumper cable is then coupled with the optical transmitter (step 410) and a second optical jumper cable is coupled with the optical receiver (step 412).

As set forth above, the method 400 includes coupling the components of an optical transmitter to a PCB (step 402). In some implementations, the optical transmitter includes one or more components configured in a chip-on-board package. For example, the driver circuit may be configured in a chip-on-board package. The optical transmitter includes a light source electrically coupled with a driver circuit. In one implementation, the driver circuit, as a bare die, may be bonded to the PCB with an adhesive. The contacts of the bare die are wire bonded to electrical contacts on the PCB. The bare die may then be covered with an encapsulating epoxy to form the chip-on-board package. In some implementations, the bare die is not covered with an encapsulating epoxy, and a lens can cover and protect the bare die. The light source may be surface mounted to the PCB. One or more electrical traces within the PCB can electrically couple the driver circuit to the light source. In other implementations, the driver circuit is wire bonded to the light source. In some implementations, the light sources includes a laser such as, but not limited to, a VCSEL or an array thereof. The optical transmitter includes a CDR in some implementations. To facilitate heat dissipation, in some implementations, one or more components of the optical transmitter are placed on a heat spreader. For example, the optical transmitter driver circuit can be placed on a heat spreader, such as a copper plane in the PCB, that wicks heat away from the driver circuit.

The method 400 also includes coupling the components of an optical receiver to the PCB (step 404). The components of the optical receiver can be coupled with the PCB using similar methods to the methods used to couple the components of the optical transmitter to the PCB. For example, the optical receiver can be a bare die that is coupled to the PCB in a chip-on-board configuration. The optical receiver is spatially separated from the optical transceiver in one or more directions. In some implementations, the optical receiver is placed between 2 mm and 5 mm away from the optical transmitter in a first and/or second direction. The optical receiver includes a light detector, such as a photodiode, or an array of light detectors and a receiver circuit. The receiver circuit includes a CDR. In some implementations, one or more components of the receiver circuit are placed on a heat spreader to disperse heat generated by the optical receiver. In some implementations, the optical transmitter and the optical receiver are coupled with different heat spreaders.

A first lens is placed on the PCB to cover the optical transmitter (step 406). The first lens is configured to focus light generated by the light source onto one or more fibers of a fiber optic jumper cable that is used to transmit the light from the optical transmitter to the exterior of the optical transceiver. The generated light is focused on to fibers by one or more optical surfaces within the lens. In some implementations, the first lens covers the driver circuit and the light source of the optical transmitter. The first lens can protect the optical transmitter from mechanical trauma and dust. For example, the first lens may replace (or supplement) the epoxy that is typically used to protect the wire bonds that form the electrical connects between the PCB and a chip-on-board package.

A second lens is placed on the PCB to cover the optical receiver (step 408). The second lens is a different lens than the first lens used to cover the optical transmitter. The second lens includes one or more optical surfaces that focus the light exiting a fiber optic cable onto a light detector of the optical receiver. The second lens covers the light detector and the receiver circuit of the optical receiver. In some implementations, the first lens and the second lens have the same design. For example, the lenses are designed with transmitting optical surfaces and receiving optical surfaces. Accordingly, when placing the first lens, the transmitting optical surfaces of the first lens are aligned with the light source of the optical transmitter. When placing the second lens, the receiving optical surfaces of the second lens are aligned with the light detector of the optical receiver. The second lens can protect the optical receiver from mechanical trauma and dust.

The method 400 also includes coupling a first optical jumper cable with the optical transmitter (step 410). In some implementations, the optical jumper cable carriers light from the optical transmitter to an optical connector. The optical connector couples an external optical cable to the optical transceiver. The optical connector can be an MPO connector or other multi-fiber connector. In some implementations, the lens of the optical transmitter includes one or more alignment posts that assist in the alignment of the fibers within the optical jumper cable with the optical surfaces of the lens.

A second optical jumper cable is then coupled with the optical receiver (step 412). The second optical jumper cable carries light from the optical connector to the optical receiver. In some implementations, the optical connector is the same optical connector to which the first optical jumper cable is coupled. For example, the optical connector may be used to both transmit and receive data from the optical transceiver. In some implementations, the lens of the optical receiver includes one or more alignment posts that assist in the alignment of the fibers within the optical jumper cable with the optical surfaces of the lens.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described systems can generally be integrated in a single product or packaged into multiple products.

What is claimed is:

1. An optical transceiver comprising:
    a printed circuit board (PCB);
    an optical transmitter including a driver circuit and a light source, wherein at least a portion of the optical transmitter is coupled to the PCB in a first chip-on-board configuration;
    an optical receiver including a receiver circuit and a light detector, wherein at least a portion of the optical receiver is coupled to the PCB in a second chip-on-board configuration, and wherein the optical transmitter and the optical receiver are spatially separated from one another on the PCB in a first dimension by a first distance of between about 2 mm and about 10 mm;
    a first lens structure covering the optical transmitter and housing the optical transmitter in a first cavity formed in the first lens structure; and
    a second lens structure, separate from the first lens structure, covering the optical receiver and housing the optical receiver in a second cavity formed in the second lens structure, wherein:
        the first lens structure and the second lens structure include a same lens configuration,
        the same lens configuration of the first lens structure and the second lens structure includes a first optical surface with a first optical prescription and a second optical surface with a second optical prescription different from the first optical prescription,
        the light source of the optical transmitter is aligned with the first optical surface of the first lens structure and the light detector of the optical receiver is aligned with the second optical surface of the second lens structure.

2. The device of claim 1, wherein the optical transmitter is separated from the optical receiver in a second dimension by a second distance between about 2 mm and about 5 mm.

3. The device of claim 2, wherein the second distance is greater than the first distance.

4. The device of claim 1, wherein the light source comprises an array of vertical-cavity surface-emitting lasers.

5. The device of claim 1, wherein the light detector comprises an array of photodiodes.

6. The device of claim 1, wherein the PCB includes a heat spreader and at least a portion of the optical transmitter sits atop a portion of the heat spreader.

7. The device of claim 1, wherein the driver circuit comprises a VCSEL driver circuit and a clock and data recovery (CDR) circuit.

8. The device of claim 1, wherein the receiver circuit comprises a transimpedance amplifier (TIA) and a clock and data recovery (CDR) circuit.

9. The device of claim 1, wherein in for each of the first and second chip-on-board configurations, an unpackaged semiconductor die is mounted directly to the PCB and electrically connected to a trace on the PCB using bond wire.

10. A method of manufacturing an optical transceiver, the method comprising:
    coupling an optical transmitter configured in a first chip-on-board package to a printed circuit board (PCB), the optical transmitter including a light source electrically coupled with a driver circuit;
    coupling an optical receiver configured in a second chip-on-board package to the PCB, the optical receiver including a receiver circuit electrically coupled with a light detector, spatially separated from one another on the PCB in a first dimension by a predetermined distance between about 2 mm and about 10 mm;
    covering the optical transmitter with a first lens structure, the first lens structure housing the optical transmitter in a first cavity formed in the first lens structure; and covering the optical receiver with a second lens structure, separate from the first lens structure, the second lens structure housing the optical receiver in a second cavity formed in the second lens structure, wherein:
the first lens structure and the second lens structure include a same lens configuration, and
the same lens configuration of the first lens structure and the second lens structure includes a first optical surface with a first optical prescription and a second optical surface with a second optical prescription different from the first optical prescription,
aligning the light source of the optical transmitter with the first optical surface of the first lens structure; and
aligning the light detector of the optical receiver with the second optical surface of the second lens structure.

11. The method of claim 10, wherein the optical transmitter is spaced away from the optical receiver in a second dimension by between about 2 mm and about 10 mm.

12. The method of claim 10, wherein the PCB includes a heat spreader and at least a portion of the optical transmitter sits atop a portion of the heat spreader.

13. The method of claim 10, wherein the driver circuit comprises a VCSEL driver circuit and a clock and data recovery (CDR) circuit and the receiver circuit comprises a transimpedance amplifier (TIA) and a clock and data recovery (CDR) circuit.

14. The method of claim 10, further comprising:
coupling a first optical jumper cable to the first lens structure; and
coupling a second optical jumper cable to the second lens structure.

15. The method of claim 10, wherein the first and second chip-on-board packages each include an unpackaged semiconductor die, and coupling the optical transmitter and optical receiver to the PCB comprises directly mounting the unpackaged semiconductor dies of the first and second chip-on-board packages directly to the PCB and electrically connecting the first and second chip-on-board packages to traces on the PCB using bond wire.

* * * * *